(12) United States Patent
Zhu et al.

(10) Patent No.: US 11,126,426 B2
(45) Date of Patent: Sep. 21, 2021

(54) METHOD AND SYSTEM FOR IMPLEMENTING SOFTWARE CHANGES USING ROLLING UPGRADES WITH REDUCED DOWNTIME

(71) Applicant: ORACLE INTERNATIONAL CORPORATION, Redwood Shores, CA (US)

(72) Inventors: Ming Zhu, Redwood City, CA (US); Rajesh Dasari, Milpitas, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 16/697,062

(22) Filed: Nov. 26, 2019

(65) Prior Publication Data

US 2021/0055925 A1  Feb. 25, 2021

Related U.S. Application Data

(60) Provisional application No. 62/888,901, filed on Aug. 19, 2019.

(51) Int. Cl.
*G06F 8/658* (2018.01)
*G06F 8/656* (2018.01)

(52) U.S. Cl.
CPC .............. *G06F 8/658* (2018.02); *G06F 8/656* (2018.02)

(58) Field of Classification Search
CPC ...................................................... G06F 8/658
USPC ........................................................ 717/172
See application file for complete search history.

(56) References Cited

U.S. PATENT DOCUMENTS

2019/0034315 A1* 1/2019 Acosta et al. .......... G06F 8/658
2019/0379723 A1* 12/2019 Demasi et al. ......... G06F 8/658

* cited by examiner

*Primary Examiner* — Wei Y Zhen
*Assistant Examiner* — Mohammed N Huda
(74) *Attorney, Agent, or Firm* — Trellis IP Law Group, PC (57) ABSTRACT

A software change system and method implements changes of a current active software version hosted one or more testing nodes of a cluster(s) to a different software version, while other nodes within the cluster(s) continue to employ the current active software version. To determine and resolve errors and incompatibilities introduced by the different software version, the at least one testing node is upgraded to the different software version and employed to query resources and data associated with the current active software version. Resolution data pertaining to the different software version is generated reflecting changes to the data employed by the different software version, or changes to the different software version, to resolve the errors and incompatibilities. The resolution data may be deployed to other nodes of the cluster(s) before, during, or after the nodes are upgraded on a rolling or other basis to the different software version.

20 Claims, 9 Drawing Sheets

```
struct upgrade_network_resource_data { virtual IP address;
network mask;
network interface name;
...
} struct upgrade_resource_data { upgrade_network_resource_data;
upgrade_local_resource_data;
upgrade_other_resource_data;
...
}
```

FIG. 7

Pseudo code for the self auto-patching a second software version via querying a first software version-

```
Sub SoftwareUpgrade()
{
    upgrade_resource_data = queryOldversion();

For (all the data in upgrade_resource_data)

{
      Find the proper resource in the second version;
      Add the resource to a table in the second software version;
    }

Shutdown first software version
    Propagate the resource data to all or some of the nodes
    Launch second software version
} upgrade_resource_data querySecondVersion()

{
    For (all items in the structure of upgrade_resource_data)

{
       Call tool to get the resource data;
       // for example, NICT (network interface config tool) to get virtual IP address, subnet, netmask, and other data
    }
}
```

METHOD AND SYSTEM FOR IMPLEMENTING SOFTWARE CHANGES USING ROLLING UPGRADES WITH REDUCED DOWNTIME

CROSS REFERENCES TO RELATED APPLICATIONS

This application claims the benefit of U.S. Provisional Patent Application Ser. No. 62/888,901, entitled METHOD AND SYSTEM FOR IMPLEMENTING SOFTWARE CHANGES, filed on Aug. 19, 2019, which is hereby incorporated by reference as if set forth in full in this application for all purposes.

BACKGROUND

The following relates to implementing changes to software applications. More particularly, the following is related to updating and/or upgrading or downgrading software applications operating on server clusters.

Traditional changes to a set of software code executing on a computing system, also referred to as a "software stack," or, simply, "software;" can require changing multiple sets of software on a rolling basis. That is, making the changes to one or a few sets at a time while the other sets are executing. The sets are typically organized as "nodes" in a system "cluster," but other arrangements are possible. Some software changes, often referred to as software updates, are generally patches to existing software to provide bug fixes discovered in the current software. Other software changes, generally referred to as software application version upgrades, are often used to improve the operation of software, add support for new models or features, etc. by updating the current version of the software to a newer version of the software (e.g., an update to the version of the software currently being used).

During such software updates there is often the need for the new software version to query or communicate with the previous version of the software and associated resources used by the previous version of the software. However, the manner of communication, also referred to as the "network stack," may be changed from the old software version to the new software version. Generally for software upgrades, since incompatibilities may exist between the previous and new software versions, a patch to the previous version of the software is typically used to remove the incompatibility between the two software versions. Making software changes, or "patches," to the previous version of the software may introduce errors and often requires that the previous version of the software be shut down, e.g., rebooted, etc., during the patching, often causing delays for the end users who generally have to wait for the patches to finish and/or errors introduced by the patch to be repaired.

Upgrading software and software applications instantiated on a "cluster" of computers, or nodes, introduces additional complexity. Similar to traditional networks, upgrading software instantiated on nodes in a cluster or clusters requires that all of the nodes be upgradable and that all of the resources called for by the new software upgrade are available. Unfortunately, in order to make sure that all of the resources are available, the previous version of the software being upgraded must be patched to allow it to provide and/or access the resources called for by the new software version, which generally already contains the new patch code calling the proper resources needed.

As such, a considerable amount of delay can be introduced when a current version of software for each node of the cluster or clusters must be patched to allow for an upgrade to the new version of the software. In addition, if the new software introduces errors, those errors must be resolved before an upgrade can be finalized, thereby causing further delays, problems, and frustration for the end users.

Another type of problem that can occur is when the new software version uses a new network stack, yet it is necessary to maintain the old network stack for communications from old software versions that are still running on nodes in a cluster while a rolling update is in progress.

SUMMARY

In implementations, a software change system is configured to process changes such as upgrades and downgrades to software code and software applications, also referred to herein as "software" hosted on one or more nodes of one or more clusters. The software upgrade system configures one or more nodes as active testing nodes employed to assist the software change system in detecting, determining, and resolving issues associated with changing the current or "active" version of the software to a different version of the software.

In one implementation, the software change system changes the current active version of the software of at least one testing node within one or more clusters to a different version of the software (e.g., different software version), while other nodes within the one or more clusters continue to employ the current active version of the software. As part of changing (e.g., upgrading or downgrading) the current active version of the software from the current active version of the software to the different version of the software, a copy of the configuration data of the at least one active test node running the current active version of the software is generated and may be stored, for example, in one or more data files. The stored configuration data may include pertinent data about the current software (e.g., stack), such as attributes, required by the active testing node or nodes to communicate with resources required using the new version of the software.

The change process further includes employing one or more testing nodes that have been upgraded to the different version of the software (e.g., new stack) to query the resources stipulated by the configuration data file to probe for errors and incompatibilities, such as data errors, communication incompatibility, etc., which may have been introduced by the next version of the software. Once the incompatibilities and errors have been processed and resolved, resolutions, such as changes to the configuration files used by the different software version may be generated as global configuration data which may be employed by other nodes in one or more clusters to provide resolutions for the errors and incompatibilities introduced by the different version of the software.

Before, after, or while changing the version of the software on the other nodes from the current active version of the software to the different version of the software, the software change system may distribute the resolutions using the global configuration data to propagate the resolutions to the configuration files of at least some of the other nodes and/or provide patches to the different version of the software.

In an implementation, a copy of a current or "original" network stack is maintained for use by the current active versions of software. The active versions of software can use the original network stack until such time as their versions are updated. In an embodiment, the changes to the network stack include changes to Internet Protocol (IP) addresses. A High Availability IP (HAIP) address (also referred to as a "Floating IP" address) includes an IP address and a subnet that may only be available, or assigned, at runtime. In some embodiments, the IP information for the network stack can be obtained from the operating system.

In an implementation, the software change system may analyze the incompatibilities and errors to discern which incompatibilities and/or errors fall within one or more tolerance levels. Such one or more tolerance levels may be used, for example, to set one or more operating margins for individual nodes, cluster, or clusters that allows the individual nodes, cluster, or clusters to tolerate at least some level of such incompatibilities and/or errors while operating.

In other implementations, the software change system may be configured to automatically repair at least some incompatibilities and/or errors. Such automatic repair may be done in open ended process, or may be done recursively using feedback until the incompatibilities and/or errors fall within one or more threshold levels.

A further understanding of the nature and the advantages of particular embodiments disclosed herein may be realized by reference of the remaining portions of the specification and the attached drawings.

DETAILED DESCRIPTION

In implementations, a software change system and method may be configured to implement changes to software, such as software version upgrade or downgrade, patches, etc., to a current active version of software employed by one or more testing nodes associated with one or more clusters to a different version of the software, while other nodes within the one or more clusters continue to employ the current active version of the software. To determine and resolve data errors and incompatibilities which may have been introduced by the different version of the software, the active testing node or nodes may be upgraded to the different version of the software and employed to query data required by the previous node configuration, that may for example, be data that is compatible but not available from the new software (e.g., new stack), and/or data that is incompatible but not available from the new software. The system and method may be configured to generate resolutions as global configuration data (e.g., operational data, patches, code changes, etc.) reflecting changes to the configuration data and/or changes to the new version of the software employed to resolve the issues and incompatibilities.

Before, after, or while changing the software version on the other nodes from the current active version of the software to the different version of the software, the software change system may distribute the resolutions as global configuration data or patches to the new version of the software to propagate some or all of the resolutions to at least some of the other nodes to resolve some or all of the errors or incompatibilities relative to a desired operating level. Such resolutions may be in virtually any form such as configuration data, patches, code changes, translations, etc.

In an implementation, the software change system and method may analyze the incompatibilities and errors received from the test nodes to discern which incompatibilities and/or errors fall within one or more tolerance levels. Such one or more tolerance levels may be used, for example, to set one or more operating margins for individual nodes, cluster, or clusters that allows the individual nodes, cluster, or clusters to tolerate at least some level of such incompatibilities and/or errors while operating.

In other implementations, the software change system and method may be configured to automatically repair at least some incompatibilities and/or errors. Such automatic repair may be done in open process, or may be done recursively using feedback until the incompatibilities and/or errors fall within one or more error thresholds or tolerance levels.

Figure 1:
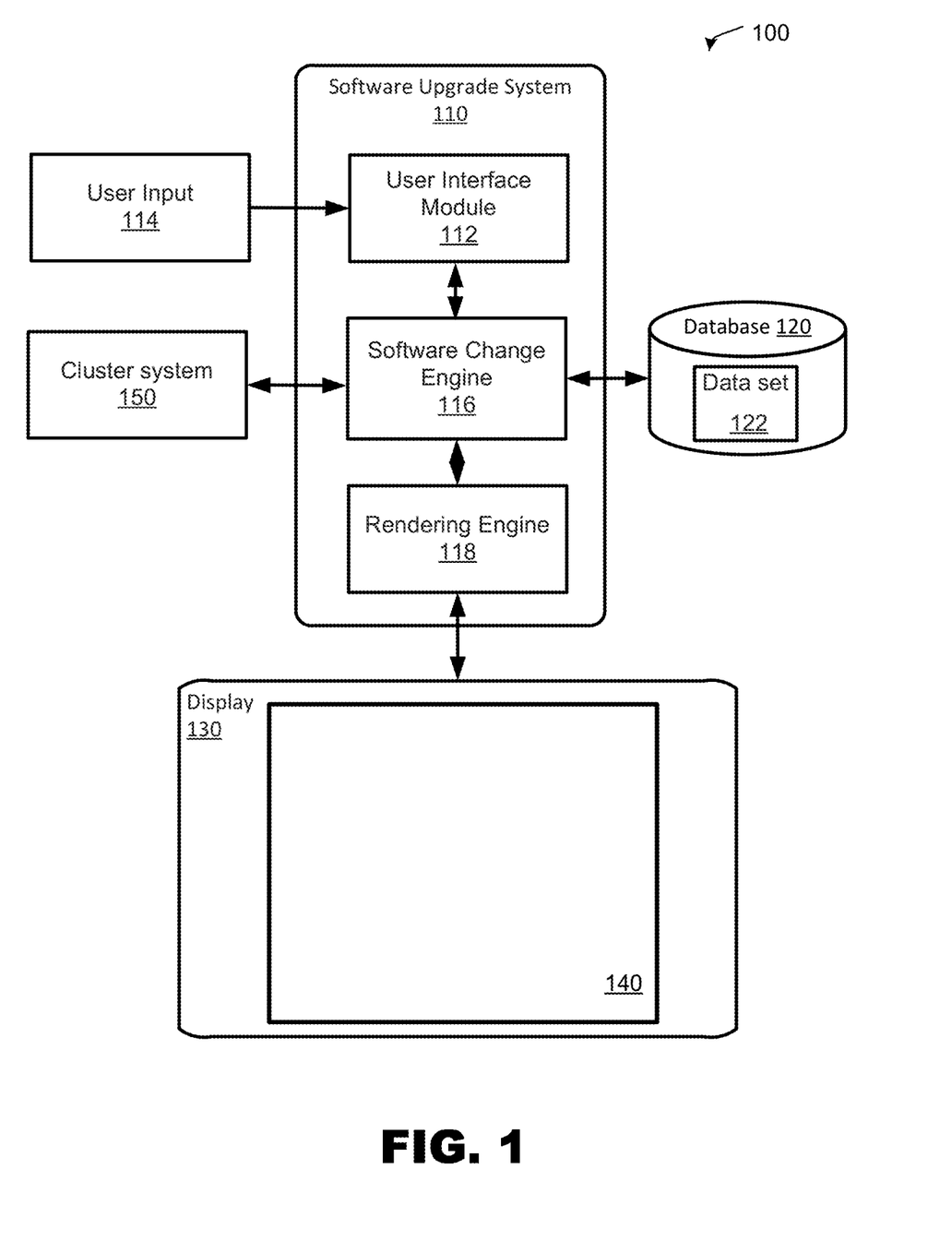
FIG. 1 is a high level illustration of a computing system used for upgrading software applications employed by clusters of nodes.

FIG. 1 is a high-level block diagram of an exemplary computing system 100 for implementing changes to software. Computing system 100 may be any computing system, such as an enterprise computing environment, client-server system, and the like. Computing system 100 includes software change system 110 configured to process data received from a user interface 114, such as a keyboard, mouse, etc., with regard to processes such as querying, analyzing, probing, data processing, generating, configuring, modeling, labeling, data binding, maintenance, etc., associated with data elements, information, and the like as described herein.

Note that the computing system 100 presents a particular example implementation, where computer code for implementing embodiments may be implemented, at least in part, on a server. However, embodiments are not limited thereto. For example, a client-side software application may implement software change system 110, or portions thereof, in accordance with the present teachings without requiring communications between the client-side software application and a server.

In one exemplary implementation, software change system 110 may be connected to display 130 configured to display data 140, for example, to a user thereof. Display 130 may be a passive or an active display, adapted to allow a user to view and interact with graphical data 140 displayed thereon, via user interface 114. In other configurations, display 130 may be a touch screen display responsive to touches, gestures, swipes, and the like for use in interacting with and manipulating data 140 by a user thereof. Gestures may include single gestures, multi-touch gestures, and other combinations of gestures and user inputs adapted to allow a user to initiate queries, resolve data errors and incompatibilities, convert data, model, analyze, simulate, deploy tests, maintain data 140, etc.

In some implementations, computing system 100 may include a data source such as database 120. Database 120 may be connected to the software change system 110 directly or indirectly, for example via a network connection, and may be implemented as a non-transitory data structure stored on a local memory device, such as a hard drive, Solid State Drive (SSD), flash memory, and the like, or may be stored as a part of a Cloud network, as further described herein.

Database 120 may contain data sets 122. Data sets 122 may include data as described herein. Data sets 122 may also include data pertaining to node operation, node attributes, configuration, querying, monitoring, testing, analyzing, software, data models, data structures, data hierarchy, nodal positions, values, value types, summations, visualizations, algorithms, code (e.g., JSON, JavaScript, PL/SQL, Typescript, XSD, XML, etc.), source, security, hashes, and the like. In addition, data sets 122 may also contain other data, data elements, and information such as metadata, labels, development-time information, run-time information, user configuration information, API, interface component information, library information, tolerance threshold data, error threshold data, simulation data, pointers, and the like.

Software change system 110 may include user interface module 112, software change engine 116, and rendering engine 118. User interface module 112 may be configured to receive and process data signals and information received from user interface 114. For example, user interface module 112 may be adapted to receive and process data from user input associated with data 140 for processing via software change system 110.

In exemplary implementations, software change engine 116 may be adapted to receive data from user interface 114 and/or database 120 for processing thereof. In one configuration, software change engine 116 is a software engine configured to receive and process input data, such as operational data, attributes, configuration data, etc., from a user thereof pertaining to data 140 from user interface module 114 and/or database 120 in order to change software from one software version to another software version relative to one or more operating thresholds, error thresholds, etc. For example, during a software change process, software change engine 116 may analyze incompatibilities and/or errors introduced by a software change to a current active version of software instantiated on one or more computing nodes of a cluster to determine resolutions to the incompatibilities and/or errors before, during, or after changing the current active version of software on other nodes of the cluster, or clusters to a different version of the software.

Moreover, software change engine 116 may be used to determine whether the incompatibilities and/or errors are within acceptable levels, where some process error thresholds may be set for benign errors and/or for other types of user and/or system acceptable errors, thereby providing for an adjustable operational tolerance for nodes and/or clusters of nodes.

For example, software change engine 116 may allow for node and/or cluster operation with an acceptable threshold level of errors, such as errors of certain types, acceptable errors, reference errors, and the like. Software change engine 116 may also be used to correct and resolve such errors offline or on the fly, with or without warnings given to a user thereof, in an open ended or recursive manner, for example, by using introspective error analysis techniques that may discern errors and software bugs that may be benign or acceptable within a given tolerance level, such as typographical errors, incorrect resource call data, etc. from other types of errors and software bugs that may be considered unacceptable, such as stack overflow errors, fatal system errors, etc.

Software change engine 116 in other implementations may be configured as a data analysis tool to perform analysis functions associated with data 140. Such analysis functions may include determining the attributes associated with data 140, determining the type of data, determining the values of the data, data types, determining the relationships to other data, interpreting metadata associated with the data, determining error types, tolerance data, and the like.

For example, software change engine 116 may be configured to receive and analyze data sets 122 to determine incompatibilities between different versions of software, errors and software bugs, user interaction values, key/value pairs, string identifiers, data properties, types of errors, error tolerance levels, user interface configuration, definitions, data processing instructions, data attributes, data hierarchy, nodes, nodal positions within the hierarchy, values, data type, summations, algorithms, source, security, hashes, and the like, associated with data sets 122.

Software change engine 116 may receive existing data sets 122 from database 120 for processing thereof. Such data sets 122 may include and represent a composite of separate data sets 122 and data elements pertaining to, for example, organizational data, which may include data such as employment data, salary data, personnel data, and the like. In addition, data sets 122 may include other types of data, data elements, and information such as input/output simulation data, contact data, sales data, production data, scientific data, financial data, medical data, census data, and the like.

Rendering engine 118 may be configured to receive configuration data pertaining to data 140, associated data sets 122, and other data associated with data 140 such as user interface components, icons, user pointing device signals, and the like, used to render data 140 on display 130. In one exemplary implementation, rendering engine 118 may be configured to render 2D and 3D graphical models, simulations, testing processes, etc., to allow a user to obtain more information about data sets 122 associated with data 140. In one implementation, upon receiving instruction from a user, for example, through user interface 114, rendering engine 118 may be configured to generate a real-time display of interactive changes being made to data 140 by a user thereof.

Software change engine 116 may also be connected to, or be part of, cluster system 150 containing one or more clusters of computing nodes (herein also referred to as "clusters of nodes" or "clusters"). In implementations, software change engine 116 may be configured and employed to change, e.g., upgrade or downgrade, software associated with one or more nodes of cluster system 150 on virtually any basis including on demand basis, ad hoc basis, pseudo random basis, rolling basis, and the like.

Figure 2:
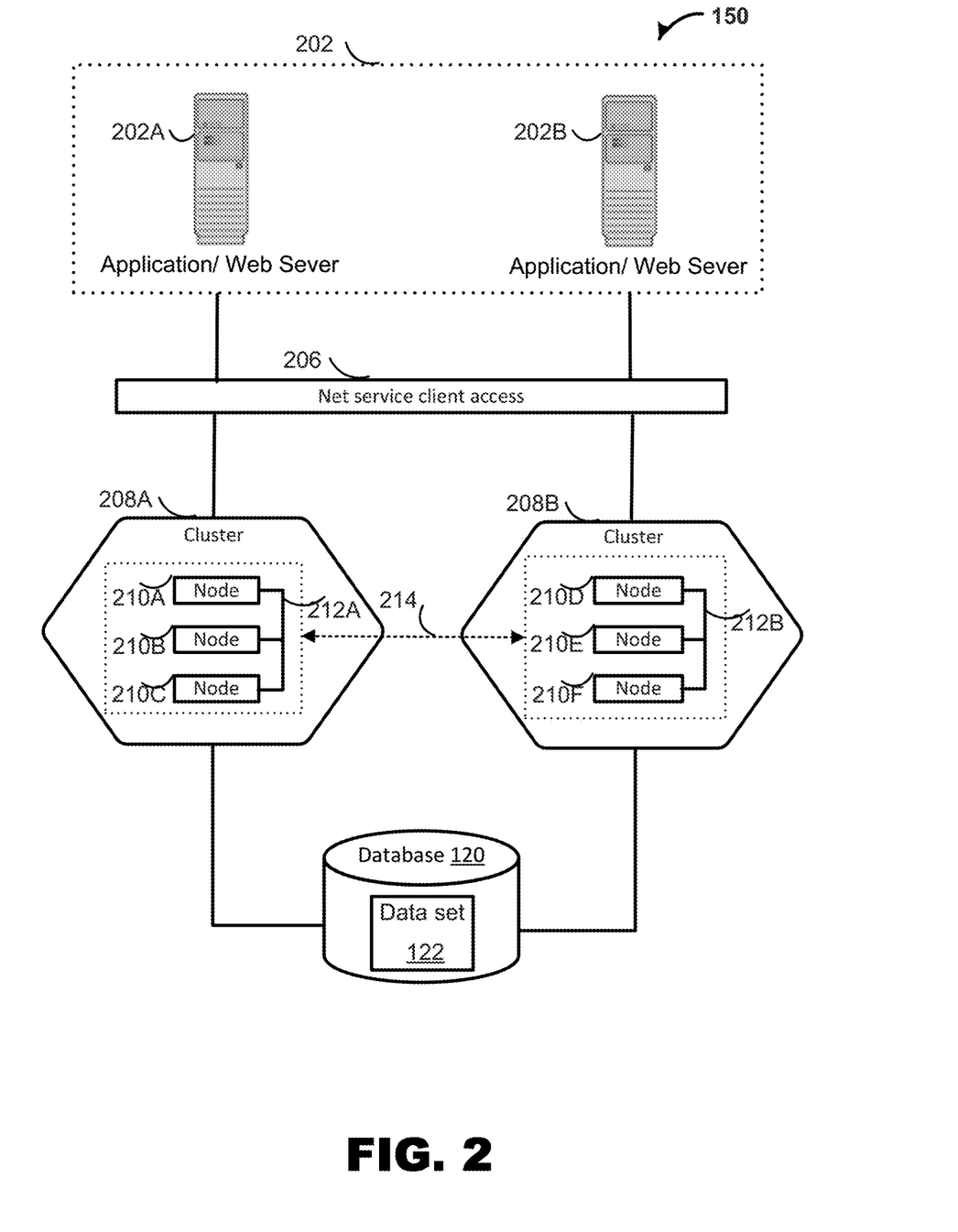
FIG. 2 is a high-level illustration of a cluster system having one or more node clusters connected to a common pool of storage.

FIG. 2 is a high-level illustration of a cluster system having one or more clusters connected to one or more databases. In one implementation, cluster system 150 represents a multinode, clustered architecture, which may include one or more application/web servers 202 in communication with one or more clusters 208 via a net service client access layer 206, such as Oracle Clusterware™. Such net service client access layer 206 may be used to manage software hosted on the webservers and to control user access to databases, such as database 120. In some implementations, net service client access layer 206 may be separate from or at least partially integrated with software change engine 116 to, for example, effectuate software changes associated with clusters 208 and nodes 210.

In an example implementation, cluster system 150 may include application/web servers 202A and 202B connected to clusters 208A and 208B. Application/web servers 202A and 202B may be configured to host one or more software applications that rely on clusters 202A and/or 202B for processing data in a distributed fashion which actively services applications and users.

In an illustrative example, each cluster 208 may include a plurality of nodes 210. Illustratively in FIG. 2, cluster 208A includes nodes 210A-C and cluster 208B includes nodes 210D-F. Each node 210 generally may be a separate data processing unit, such as a server, computer, CPU, etc., but also may be formed using a number of interconnected data processing units. While a server in a cluster 210 may be similar to a standalone server, servers in a cluster 208 typically operate together using an interconnect network 212 and may be separated into public and private networks. For example, cluster 208A includes interconnect network 212A and cluster 208B includes interconnect network 212B.

In order to provide for communication between clusters 208, a communication network 214 may be configured to connect clusters 208 together thereby allowing data to be communicated between clusters 208. For example, as illustrated in FIG. 2, communication network 214 may be configured to connect clusters 208A and 208B together to allow data and other communication, such as software changes, patches, and the like to be communicated between clusters 208A and 208B.

Figure 3:
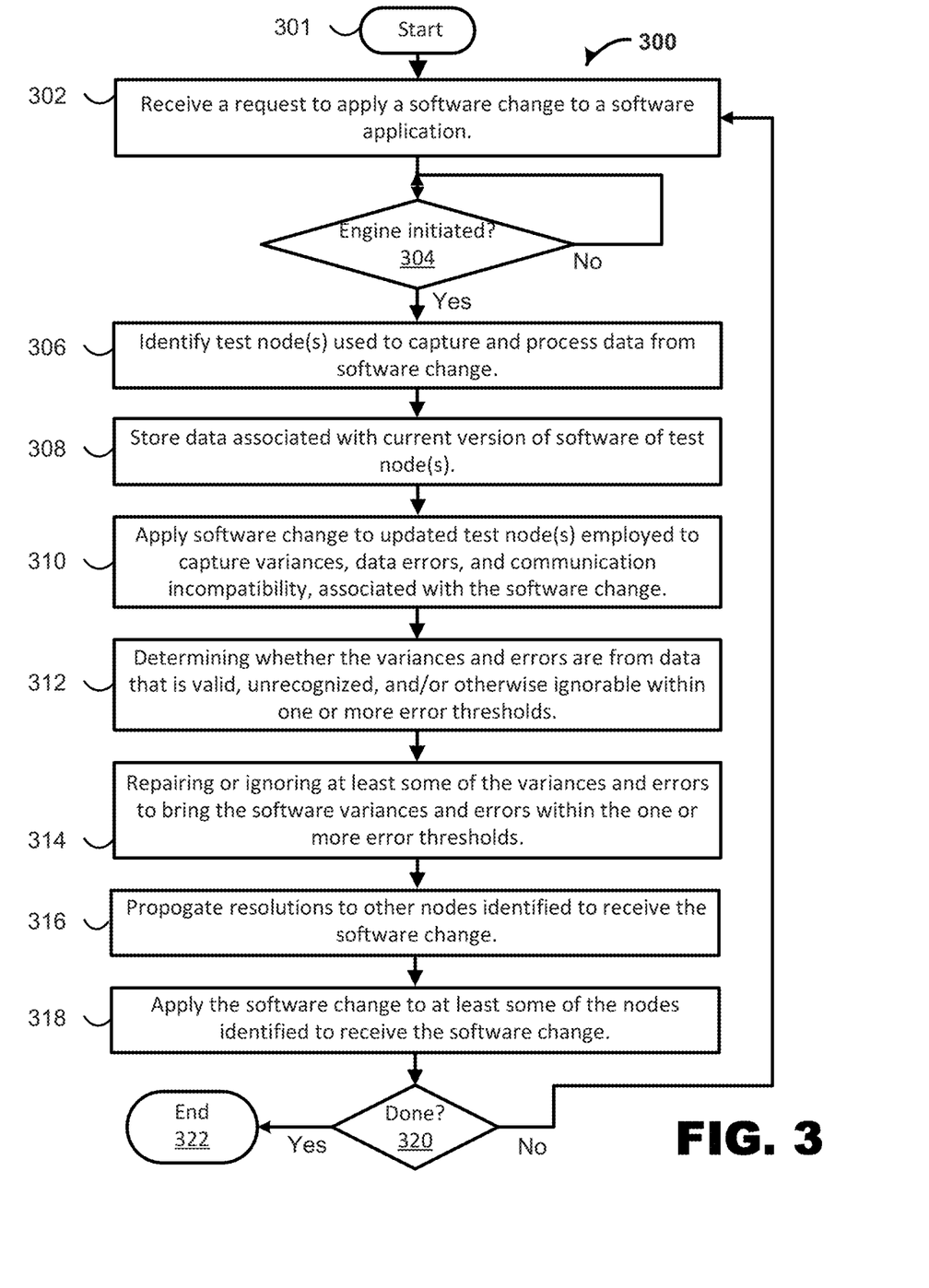
FIG. 3 is a high-level flow diagram illustrating a method for providing changes to software applications.

FIG. 3 is a high-level flow diagram illustrating a method 300 for providing changes to software applications, etc., (e.g. version changes to software code, patches, etc.). After initialization at 301, at 302, a system such as software change system 110 may obtain user input from, for example, user input 114, or the like, providing a User Interface (UI), etc. for accepting input to change software using, for example, a software version change, code change, patch, etc. At 304, method 300 determines whether an engine (e.g., process) to change software, such as software change engine 116, has been initiated. If so, method 300 proceeds to 306. If not, method 300 returns to 304.

At 306, method 300 identifies nodes that are part of a cluster of nodes to employ as test nodes employed to facilitate changes to software hosted one or more clusters of nodes. For example, referring to FIG. 2, method 300 may identify one or more nodes 210 from nodes 210A-F associated with clusters 208A-B to employ to effectuate software changes to software hosted on or associated with one or more nodes 210A-F and other nodes 210 associated with clusters 208A and 208B.

At 308, a copy of at least a subset of the operational data for the one or more test nodes is generated and may be stored for example as a data file, as temporary memory, etc., in order to preserve a current first operational version of the one or more test nodes relative to the active first version of the software employed by the one or more test nodes. The data generated may be any type of data that may be required to operate the active first version of the software, which would need to be supported by the second version of the software once activated. For example, referring to FIG. 2, a copy of operational data for node 210A employed as a test node may be generated and stored as a data file.

Such operational data may also include other types of data not necessarily needed for operation of both the current first version of the software and the second version. For example, such other data may be used to provide additional software update instructions, update parameters, software update schedules, patches for the second version of the software to be employed at a later time, software downgrade instructions, etc.

At 310, method 300 changes (e.g., updates) the software of the one or more test nodes from the current first version of the software to the second version of the software while maintaining the current version of the software on other nodes of the cluster or clusters associated with the software change. Method 300 may then employ at least some of the one or more test nodes to detect, capture, and process data used to analyze variances, data errors, and communication incompatibility, associated with the software change.

For example, referring to FIG. 2, method 300 may upgrade or downgrade the current first version of the software on test node 210A to the second version of the software and then run queries with upgraded test node 210A to determine whether the upgrade or downgrade has introduced differences such as data variances, data errors, communication incompatibilities, etc. If such variances, data errors, communication incompatibilities, etc. are found, method 300 may generate and store data reflecting such differences, for example, in a data file.

In some scenarios, test nodes, such as test node 210A may be required to be shut down, rebooted, or refreshed, to effectuate the change. As such, having the stored operational data allows the test node once rebooted to be configured for use with the first version of the software based on the operational data carried over from the first version of the software.

At 312, method 300 determines whether such variances, data errors, and communication incompatibilities have been introduced from data that is valid, unrecognized, and/or otherwise ignorable within one or more error thresholds. For example, method 300 may be configured to actively detect and determine erroneous incompatibilities introduced by the current active version of the software which may be ignorable and/or repairable, such as calls to software features no longer needed, redundant calls, calls to features needed in a different software set, etc.

At 314, method 300 may repair or ignore at least some of the variances and errors to bring the software variances and errors within the one or more error thresholds. For example, method 300 may be configured to repair at least some incompatibilities, variances, and errors by, for example, patching the different software set to remove the erroneous issues (e.g., remove an erroneous call), repair typographical errors, repair missing syntax, delete duplicate calls, repair erroneous databases calls, etc. Thus, method 300 allows software change system 100 to actively ignore and/or repair erroneous incompatibilities to at least some level to help prevent failures from being introduced by the different version of the software.

At 316, method 300 generates and propagates resolutions to at least some other nodes identified to receive the software change. In one implementation, method 300 generates and transmits resolution data to at least one other node pending such software change. Such resolution data may be used, for example, in a rolling upgrade or downgrade process. In one scenario, during a rolling upgrade process, method 300 may upgrade a first set of test nodes and transmit resolution data to a second set of test nodes which are then used to verify the resolution data works on a different set of nodes.

If, for example, incompatibilities, variances, and errors are discovered by a set of test nodes, or another set of test nodes during the rolling upgrade, then method 300 may repair such incompatibilities, variances, and errors, as needed, or may initiate a downgrade process to downgrade the set or sets of test nodes back to a previous version of the software.

In addition, method 300 may set an optional flag signal that the upgraded software is incompatible. Such rolling upgrade process allows method 300 to implement a step-by-step verification process to ensure compatibility of the upgraded software to the entire cluster, or clusters of nodes. In addition, if the upgraded software is found to be incompatible at some point along the rolling upgrade process, method 300 provides for a downgrade process to downgrade the software back to a compatible version.

At 318, method 300 applies at least some of the software change to at least some of the nodes identified to receive the software change. In addition, method 300 may apply such software changes to other clusters hosting the current active version of the software.

At 320, method 300 determines whether the session is finished or there is another software change process. If not, method 300 returns to 301. If so, method 300 ends at 322.

Figure 4:
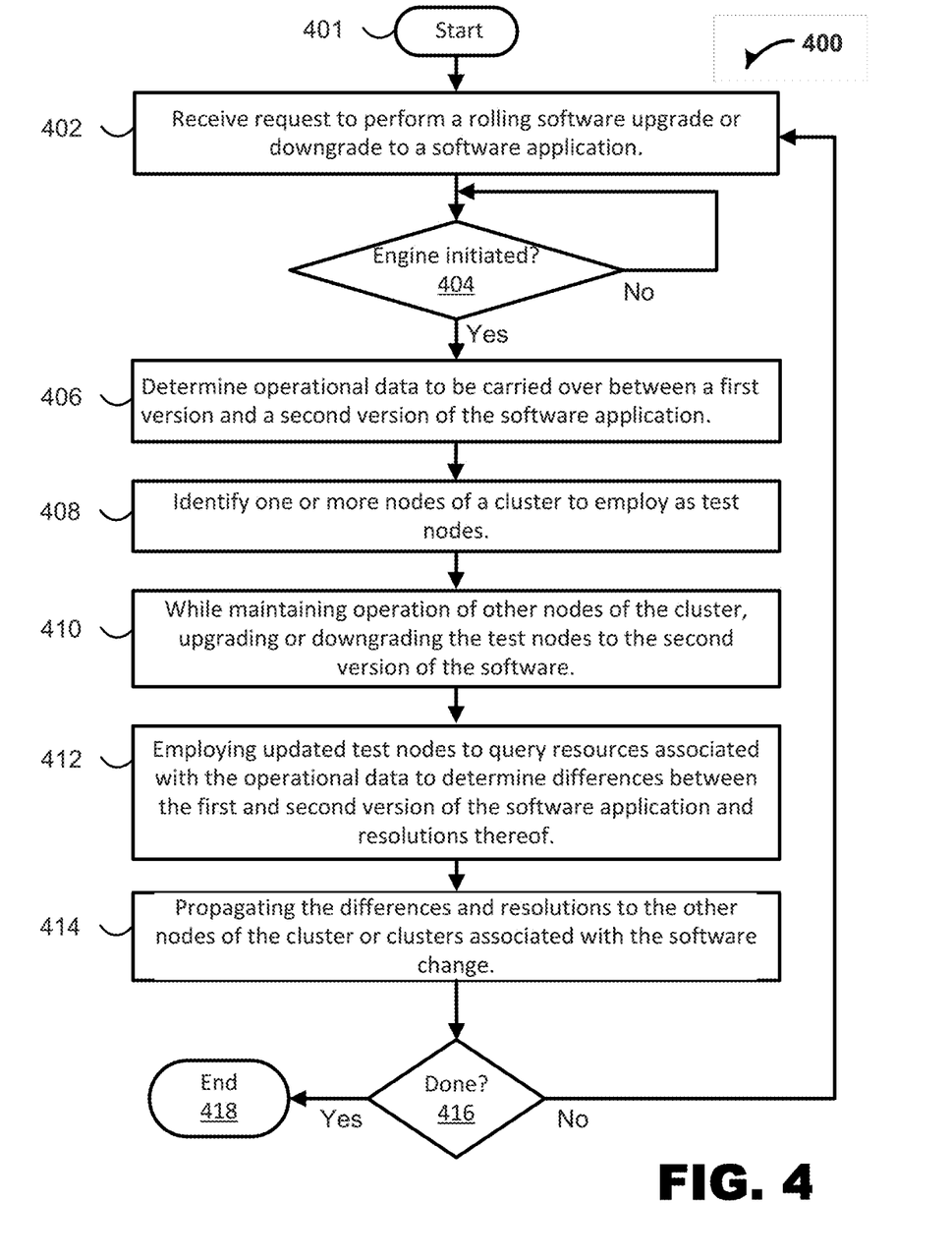
FIG. 4 is a high-level flow diagram illustrating a method for providing changes to software applications instantiated on one or more clusters.

FIG. 4 is a high-level flow diagram illustrating a method 400 for providing rolling software upgrades or rolling software version downgrades to software applications. After initialization at 401, at 402, a system such as software change system 110 may obtain user input from, for example, user input 114, or the like, providing a UI, etc. for accepting input to change a software version using, for example, a software version change, patch, etc. At 404, method 400 determines whether an engine (e.g. process, software application, etc.) configured to implement a software changes, such as software change engine 116, has been initiated. If so, method 400 proceeds to 406. If not, method 400 returns to 404.

At 406, method 400 determines operational data to be carried over between a first version and a second version of the software application. For example, as illustrated in FIG. 5, a table 500 may be maintained that consists of the attributes to be carried over from the current active version of the software to another version of the software.

In one scenario, such attributes may be required attributes pertaining to required resources that the new software is required to process. However, in other scenarios, table 500 may include different numbers or types of data, resources, or attributes than are required. For example, table 500 may contain other types of data such as resource address conversion data, to address changing addresses, known future attribute updates and dates to update, upgrade or downgrade instructions, etc.

Figure 5:
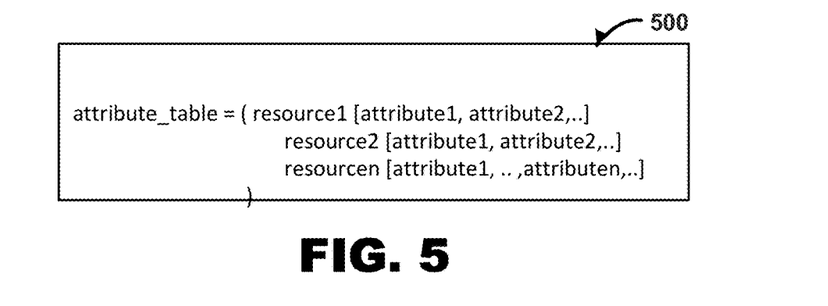
FIG. 5 is a high-level diagram illustrating an example attribute table.
Figure 6:
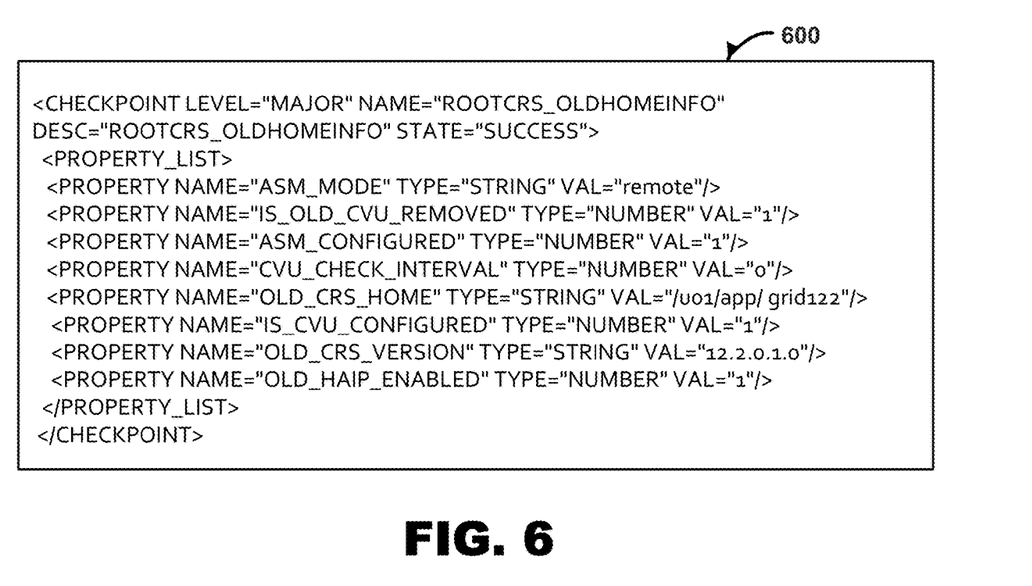
FIG. 6 is a high-level diagram illustrating an example configuration file.

In an implementation, method 400 may generate and configure table 500, illustrated in FIG. 5, as a data or other type of structure to store configuration data of at least the current active version of the software. Table 500 may also be used to store configuration changes, e.g., resolutions, to be propagated to the other nodes of the cluster to use when they are upgraded to the new version of the software. For example, table 500 illustrates an Extensible Markup Language (XML) file that may be used to store configuration information as properties associated with a test node, which gets copied to the other nodes in the cluster before, during, or after the other nodes are updated to another version of the software.

At 408, method 400 identifies one or more nodes of a cluster, or clusters, to employ as test nodes. For example, referring to FIG. 2, similar to as discussed supra, method 400 may configure one or more nodes 210 as test nodes to be able to actively capture, detect, and process data employed to analyze incompatibilities, variances, and errors when upgrading the one or more test nodes 210 from the current active version of the software to another version of the software prior to upgrading the remaining nodes of the cluster or clusters.

At 410, while maintaining operation of other nodes of the cluster or clusters at the current active first version of the software, method 400 upgrades (or downgrades) the test nodes from the first version of the software to a second version of the software. For example, referring to FIG. 2, one or more of the test nodes 210A-F are identified and upgraded from a first version of the software currently running on the one or more test nodes 210A-F, to a second version of the software.

Figure 7:
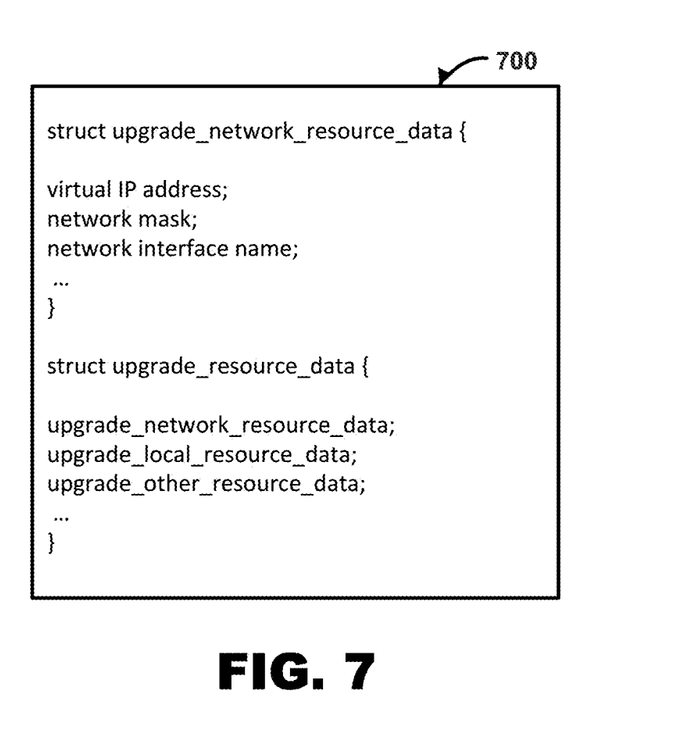
FIG. 7 is a high-level diagram illustrating an example data structure.

At 412, method 400 employs at least some of the test nodes to determine differences between operation of the test nodes before and after being updated from the first version of the software to the second version of the software. In one implementation, method 400 employs operational data, which may contain at least some data considered critical for operation to use with the upgraded test node or nodes. For example, operational data may be provided from the test node or nodes prior to or during the software upgrade, which may be stored and retrieved from a data structure 700 as illustrated in FIG. 7.

In some implementations, method 400 may employ upgraded test nodes to run queries using at least some data considered critical for operation in order to, for example, determine differences resulting from errors and incompatibilities between the software versions such as communication errors, syntax errors, typographical errors, missing or inaccurate resource address errors, duplicate calls, runtime errors, invalid instructions, invalid memory addresses, etc. In addition, differences also may be from data required by the second version of the software, which is unavailable, but compatible with the first version of the software, or data required by the second version of the software, which is available, but incompatible with the first version of the software.

In implementations, once method 400 determines at least some of the differences, method 400 may be configured to determine resolutions, and then prepare the resolutions for propagations to other nodes being upgraded to the second version of the software. For example, method 400 may determine the resource differences called by the second version of the software, i.e., now the current active software version of the test nodes, relative to the first version of the software, i.e. a previous active software version, and store such resource differences as a table of resource differences for use by the other nodes before, during, or after being updated to the second version of the software.

At 414, method 400 propagates the differences and resolutions to other nodes of the cluster or clusters associated with the software change. In some implementations, method 400 may employ an automated process to determine and propagate the differences and resolutions to the other nodes of the cluster or clusters associated with the software change.

Figure 8:
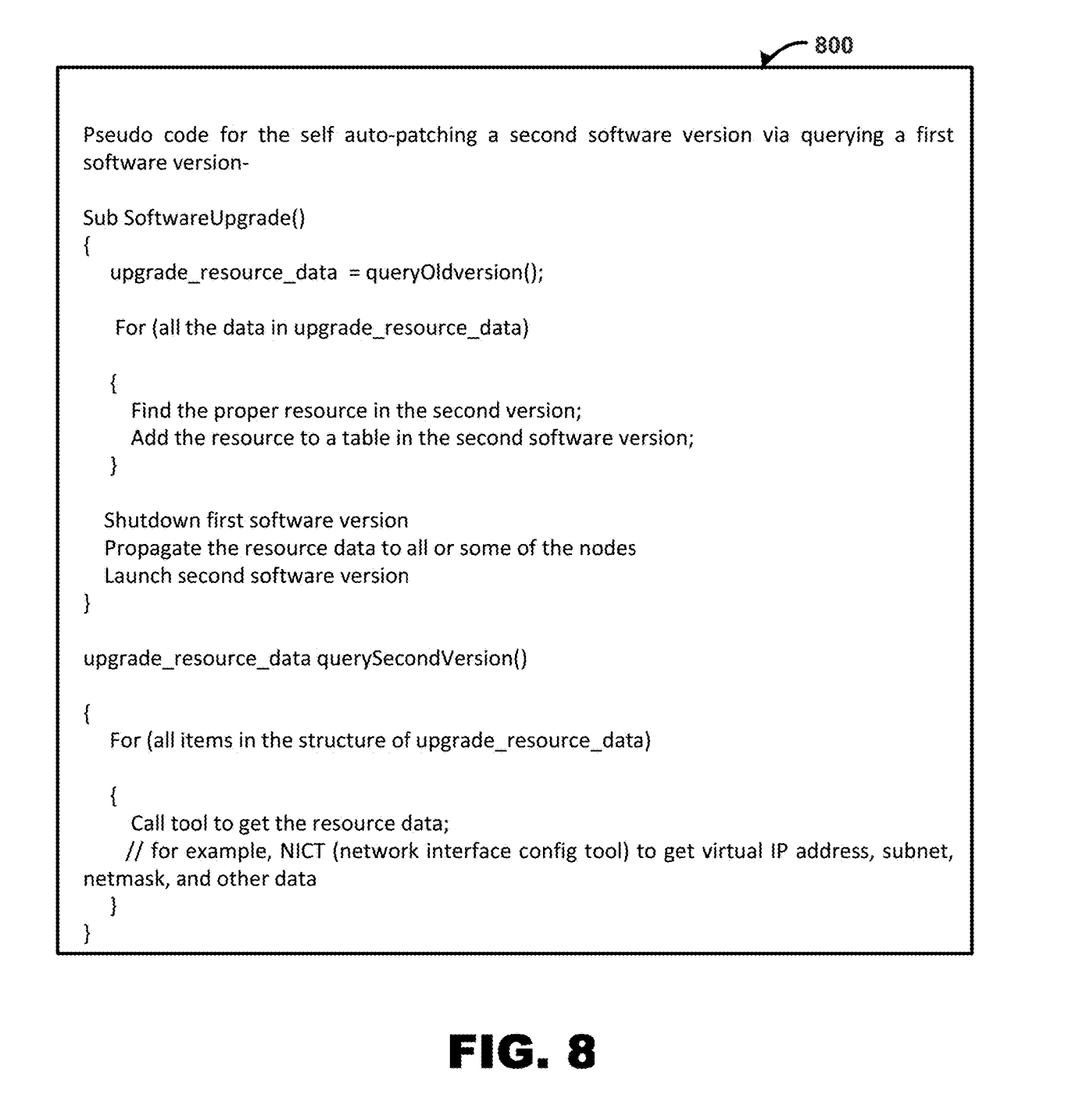
FIG. 8 is a high-level diagram illustrating example pseudo code used to change a version of a software application via querying another version of the software application.

For example, referring to FIG. 8 showing pseudo code 800, method 400 may query the current active software version, e.g., the first version, to determine resources necessary based on the first version of the software, upgrade the test node or nodes to another software version, e.g., the second version of the software, and determine the differences to resolve, as an example, resource communication issues, between the first version of the software and the second version of the software. Method 400 may then propagate those differences to the other nodes running the first version of the software, and then update one or more of the other nodes of the cluster or clusters to the second version of the software.

In some implementations, such differences may be used to provide a mechanism to effectuate the upgrade to the second version of the software without having to patch the first version of the software. For example, method 400 may be used to provide a translation between the first version of the software and the second version of the software and may also be used to change or "patch" the second version of the software such that the second version of the software operates within a tolerance threshold.

Advantageously, since other nodes of the cluster or clusters are kept operating with the prior version of the software, method 400 provides functionality to perform a software change, such as rolling upgrade or downgrade, without the need to update or patch the current active software version, e.g., the first version of the software, when the upgrade requires some new information from the current active software version.

Although the description has been described with respect to particular embodiments thereof, these particular embodiments are merely illustrative, and not restrictive.

Figure 9:
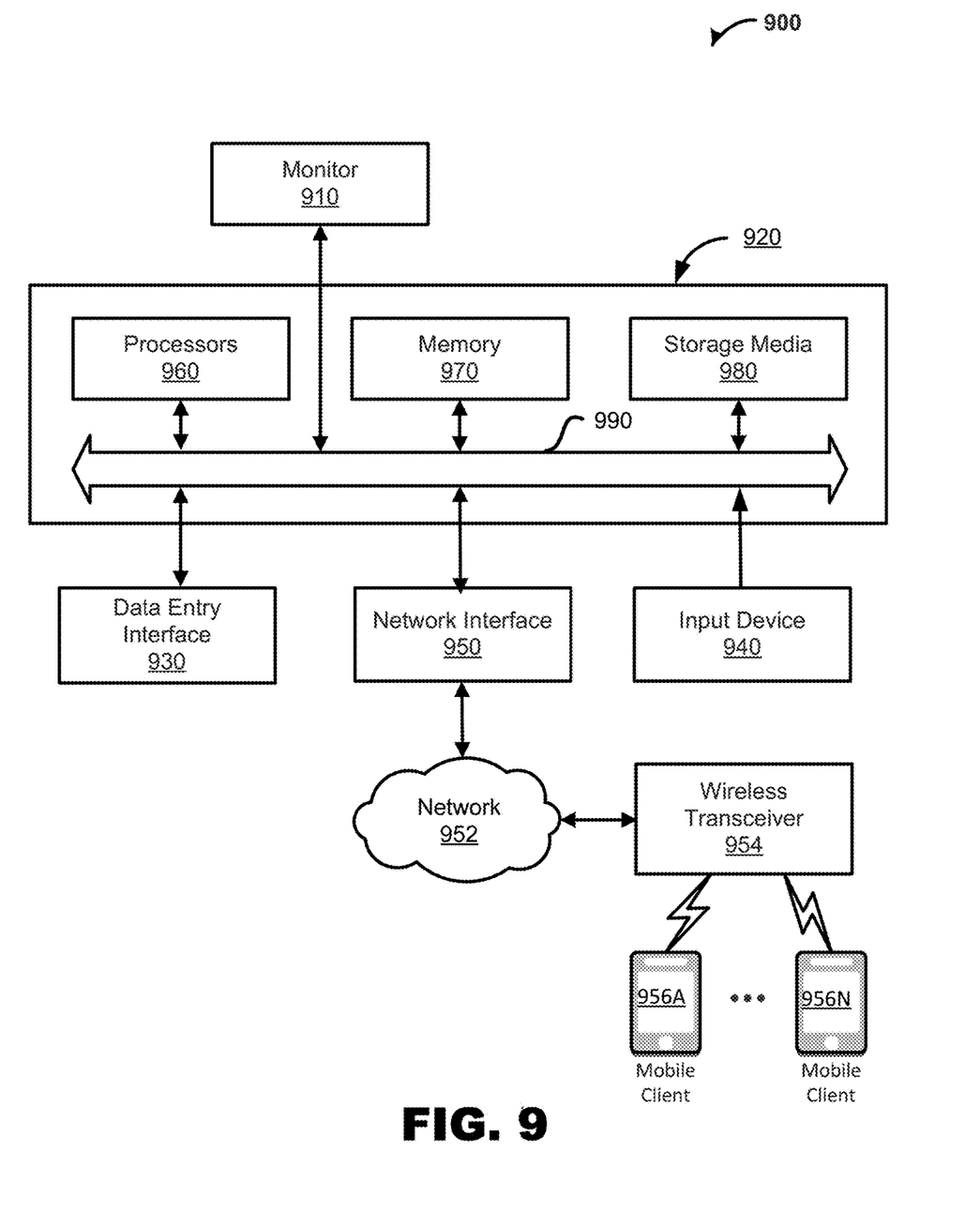
FIG. 9 is a high-level block diagram of an exemplary computer and communication system.

FIG. 9 is a block diagram of an exemplary computer system 900 for use with implementations described herein. Computer system 900 is merely illustrative and not intended to limit the scope of the claims. One of ordinary skill in the art would recognize other variations, modifications, and alternatives. For example, computer system 900 may be implemented in a distributed client-server configuration having one or more client devices in communication with one or more server systems.

In one exemplary implementation, computer system 900 includes a display device such as a monitor 910, computer 920, a data entry device 930 such as a keyboard, touch device, and the like, a user input device 940, a network communication interface 950, and the like. User input device 940 is typically embodied as a computer mouse, a trackball, a track pad, wireless remote, tablet, touch screen, and the like. Moreover, user input device 940 typically allows a user to select and operate objects, icons, text, characters, and the like that appear, for example, on the monitor 910.

Network interface 950 typically includes an Ethernet card, a modem (telephone, satellite, cable, ISDN), (asynchronous) digital subscriber line (DSL) unit, and the like. Further, network interface 950 may be physically integrated on the motherboard of computer 920, may be a software program, such as soft DSL, or the like.

Computer system 900 may also include software that enables communications over communication network 952 such as the HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 952 may include a local area network, a wide area network, a wireless network, an Intranet, the Internet, a private network, a public network, a switched network, or any other suitable communication network, such as for example Cloud networks. Communication network 952 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 952 may communicate to one or more mobile wireless devices 956A-N, such as mobile phones, tablets, and the like, via a base station such as wireless transceiver 954.

Computer 920 typically includes familiar computer components such as a processor 960, and memory storage devices, such as a memory 970, e.g., random access memory (RAM), storage media 980, and system bus 990 interconnecting the above components. In one embodiment, computer 920 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 970 and Storage media 980 are examples of tangible non-transitory computer readable media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Figure 10:
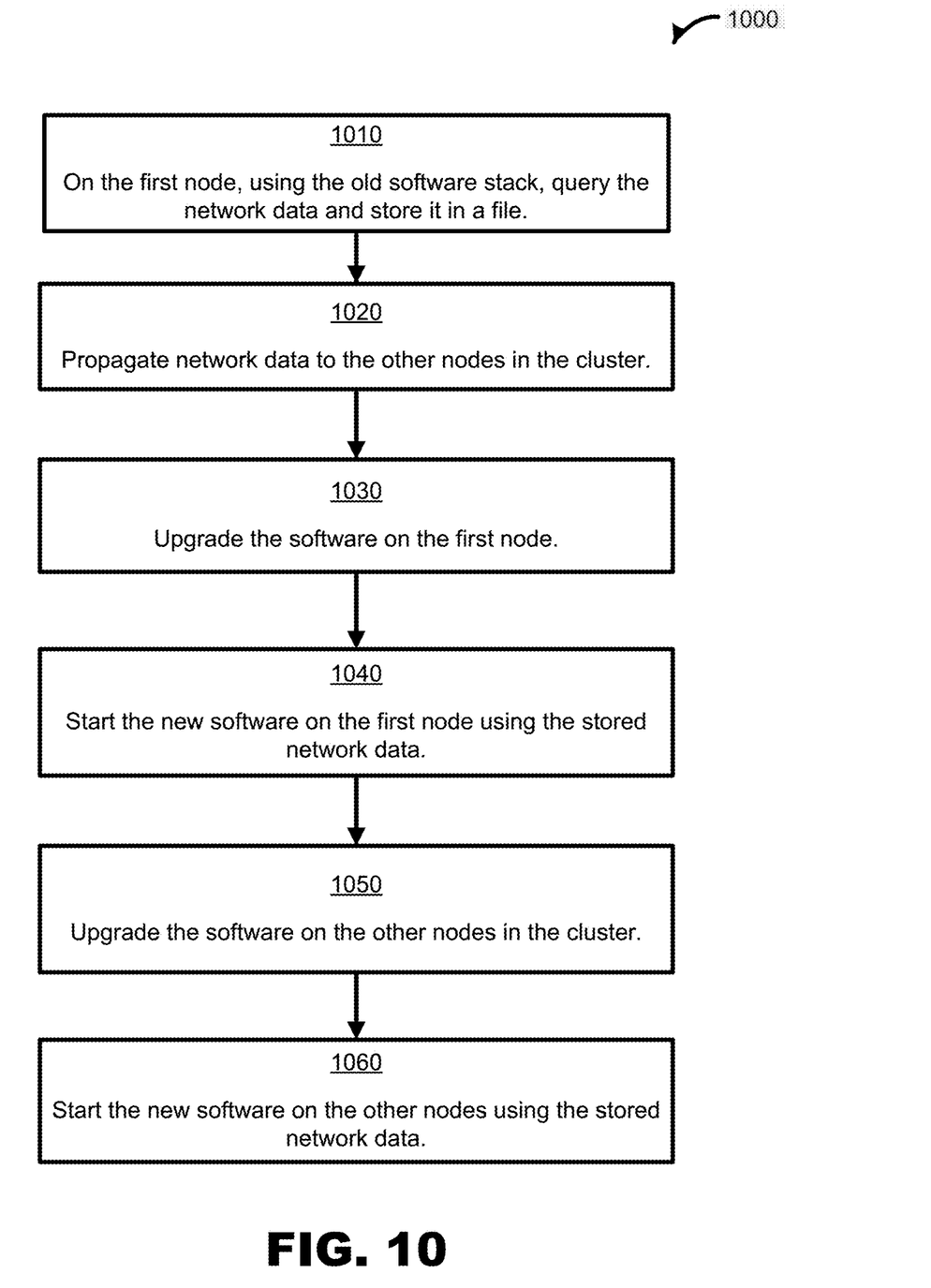
FIG. 10 illustrates a flowchart showing basic steps in a method of an embodiment.

FIG. 10 illustrates a flowchart showing basic steps in a method of an embodiment. This illustration is a simplified portrayal of one example. Steps may be added to, removed from, or otherwise modified from those shown in FIG. 10 while still achieving desired functionality.

In FIG. 10, flowchart 1000 includes a first step 1010 where network data from the existing ("old" or "current") software stack (i.e., "system" or set of software, or merely "software") is obtained. In an embodiment the network data is necessarily obtained at runtime since some of the network data is only created or defined at runtime. For example, one or more floating IP addresses that can include subnet or other information may need to be obtained from the operating environment at the time of execution of one or more components in the software stack.

At step 1020, the network data (also referred to as the "network stack" as opposed to the "software stack") is propagated to other nodes in the cluster. Although description of the system is with respect to a cluster architecture with multiple nodes, features described herein may be applicable to other architectures or arrangements of hardware and software.

At step 1030, the software is upgraded on a first ("test") node. Then, at step 1040, the new software is started on the first node using the previously stored, old network data.

At step 1050, after testing on the first node is completed, the software on other nodes is upgraded. In one embodiment, the upgrading is sequential. That is, one node at a time. In other embodiments, more than one node may be updated concurrently. Each of the nodes use the old network data obtained from running the upgraded software on the first node. In an embodiment, the old network data is propagated from the Oracle Grid Infrastructure stack running on the first node.

At step 1060, the upgraded software installed on all the nodes forms the new software system. Upon startup of this system (re-start) the first node obtains the new network data at runtime and propagates the new network data to the other nodes. Thus, the upgraded software of all nodes in the cluster will now run with new network data.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including one or more instructions executable by one or more processors for:

configuring a node of a cluster of nodes in a server system as a test node, wherein the test node and other nodes in the cluster of nodes include a first version of a software application operating on the test node and the other nodes;

receiving a first set of operational information from the test node pertaining to the operation of the first version of the software application communicating with an original network stack operating on the test node, wherein the original network stack includes a manner of communication and one or more IP addresses;

storing at least one copy of the original network stack for access by the test node and the other nodes;

updating the first version of the software application on the test node to a second version of the software application while maintaining the operation of the first version of the software application on the other nodes;

executing the second version of the software application by using the at least one copy of the original network stack;

employing the test node updated to the second version of the software application to determine differences from the original network stack to a new network stack between the operation of the test node running the first version of the software application to the test node running the second version of the software application with respect to the first set of operational information pertaining to the original network stack;

determining if the differences from the original network stack can be ignored or must be resolved;

executing other first versions of the software application on the other nodes by using the original network stack;

deploying the new network stack to configure at least one of the other nodes of the cluster of nodes; and updating the at least one of the other nodes to the second version of the software application.

2. The computer readable medium of claim 1, wherein the one or more instructions executable by one or more processors include instructions for employing the differences to generate a second set of operational information employed by the at least one of the other nodes updated to the second version of the software application.

3. The computer readable medium of claim 1, wherein the one or more instructions executable by one or more processors include instructions for employing the differences to modify the second version of the software application to a third version of the software application.

4. The computer readable medium of claim 3, wherein the one or more instructions executable by one or more processors include instructions for updating the at least one of the other nodes to the third version of the software application.

5. The computer readable medium of claim 1, wherein determining the differences comprises determining if data required by the second version of the software application is unavailable but compatible with the first version of the software application.

6. The computer readable medium of claim 1, wherein determining the differences comprises determining if data required by the second version of the software application is available but incompatible with the first version of the software application.

7. The computer readable medium of claim 1, wherein the one or more instructions executable by one or more processors include instructions for analyzing the differences to determine whether at least some of the differences are within a tolerance level.

8. The computer readable medium of claim 1, wherein the one or more instructions executable by one or more processors include instructions for analyzing the differences to determine whether at least some of the differences are repairable differences.

9. The computer readable medium of claim 8, wherein at least one of the differences is a repairable difference and the one or more instructions include instructions for automatically repairing said at least one repairable difference.

10. The computer readable medium of claim 8, wherein at least one of the differences is a repairable difference and the one or more instructions include instructions for employing a recursive process to repair said at least one repairable difference.

11. A computer implemented method, comprising:
configuring a node of a cluster of nodes in a server system as a test node, wherein the test node and other nodes in the cluster of nodes include a first version of a software application operating on the test node and the other nodes;
receiving a first set of operational information from the test node pertaining to the operation of the first version of the software application communicating with an original network stack operating on the test node, wherein the original network stack includes a manner of communication and one or more IP addresses;
storing at least one copy of the original network stack for access by the test node and the other nodes;
updating the first version of the software application on the test node to a second version of the software application while maintaining the operation of the first version of the software application on the other nodes;
executing the second version of the software application by using the at least one copy of the original network stack;
employing the test node updated to the second version of the software application to determine differences from the original network stack to a new network stack between the operation of the test node running the first version of the software application to the test node running the second version of the software application with respect to the first set of operational information pertaining to the original network stack;
determining if the differences from the original network stack can be ignored or must be resolved:
executing other first versions of the software application on the other nodes by using the original network stack;
updating at least one of the other nodes to the second version of the software application; and
deploying the new network stack to configure the at least one of the other nodes.

12. The method of claim 11, further comprising employing the differences to generate a second set of operational information employed by the at least one of the other nodes updated to the second version of the software application.

13. The method of claim 11, further comprising employing the differences to modify the second version of the software application to a third version of the software application.

14. The method of claim 13, further comprising updating the at least one of the other nodes to the third version of the software application.

15. The method of claim 11, wherein determining the differences comprises determining data required by the second version of the software application is unavailable but compatible with the first version of the software application.

16. The method of claim 11, wherein determining the differences comprises determining data required by the second version of the software application is available but incompatible with the first version of the software application.

17. The method of claim 11, further comprising analyzing the differences to determine whether at least some of the differences are within a tolerance level.

18. The method of claim 11, further comprising analyzing the differences to determine whether at least some of the differences are repairable.

19. The method of claim 11, further comprising:
employing the differences to configure one or more nodes of at least another cluster of nodes hosting the first version of the software application; and
updating the one or more nodes of the at least another cluster of nodes to the second version of the software application.

20. A computing environment in a server, the computing environment comprising a cluster of nodes and operable for changing a software application from a first version to a second version, wherein each node comprises a processor operable to execute instructions related to a first version of the software application, wherein the server comprises a processor executing instructions including the following steps for changing the software application version:
configuring a node of the cluster of nodes as a test node;
receiving a first set of operational information from the test node pertaining to operation of the first version of the software application communicating with an original network stack operating on the test node, wherein the original network stack includes a manner of communication and one or more IP addresses;
storing at least one copy of the original network stack for access by the test node and the other nodes in the cluster;
changing the first version of the software application on the test node to a second version of the software application while maintaining the operation of the first version of the software application on the other nodes;
executing the second version of the software application by using the at least one copy of the original network stack;
employing the test node updated to the second version of the software application to determine differences from the original network stack to a new network stack between the operation of the test node running the first version of the software application to the test node running the second version of the software application with respect to the first set of operational information pertaining to the original network stack;
determining if the differences from the original network stack can be ignored or must be resolved;
executing other first versions of the software application on the other nodes by using the original network stack;
updating at least one of the other nodes to the second version of the software application; and deploying the new network stack to configure the at least one of the other nodes.

\* \* \* \* \*

UNITED STATES PATENT AND TRADEMARK OFFICE
CERTIFICATE OF CORRECTION

PATENT NO. : 11,126,426 B2
APPLICATION NO. : 16/697062
DATED : September 21, 2021
INVENTOR(S) : Zhu et al.

Page 1 of 1

It is certified that error appears in the above-identified patent and that said Letters Patent is hereby corrected as shown below:

In the Drawings

On sheet 3 of 9, in FIG. 3, under Reference Numeral 316, Line 1, delete "Propogate" and insert -- Propagate --, therefor.

In the Specification

In Column 3, Line 30, delete "high level" and insert -- high-level --, therefor.

In the Claims

In Column 15, Line 30, in Claim 11, after "to" delete "the".

In Column 15, Line 53, in Claim 11, delete "resolved:" and insert -- resolved; --, therefor.

In Column 16, Line 44, in Claim 20, after "and" delete "the".

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*